United States Patent [19]

Brass et al.

[11] 4,009,668
[45] Mar. 1, 1977

[54] PLANTER APPARATUS AND METHOD FOR PLANTING

[75] Inventors: Ronald William Brass, Bettendorf, Iowa; Harold Valentine Hansen, Cordova, Ill.

[73] Assignee: Deere & Company, Moline, Ill.

[22] Filed: July 7, 1975

[21] Appl. No.: 593,798

[52] U.S. Cl. .............................. 111/85; 111/88; 172/538; 172/559
[51] Int. Cl.² .......................................... A01C 5/06
[58] Field of Search .............. 111/85–88; 172/239, 536, 538–539, 559–560, 575

[56] References Cited

UNITED STATES PATENTS

| | | | |
|---|---|---|---|
| 1,286,044 | 11/1918 | McNeal | 111/87 |
| 2,155,443 | 4/1939 | Parks et al. | 111/85 X |
| 2,332,012 | 10/1943 | Rasmussen | 111/88 X |
| 2,685,243 | 8/1954 | Cole | 111/88 X |
| 3,005,426 | 10/1961 | Sorenson et al. | 111/85 X |
| 3,217,674 | 11/1965 | Williams | 111/86 |
| 3,499,495 | 3/1970 | Pust | 172/536 |
| 3,633,522 | 1/1972 | Main | 111/86 X |

*Primary Examiner*—Robert E. Bagwill

[57] ABSTRACT

A method and apparatus for planting seeds. A V-shaped seed furrow having a predetermined depth is continuously formed while the soil adjacent each side of the furrow is uniformly firmed or compacted and a smooth surface formed. Seeds are continuously dispensed into the furrow. The walls of the furrow are then compacted about the seed as the furrow edges are collapsed over the seed to leave a comparatively non-compacted layer of soil above the seed. The planter is provided with a pair of furrow forming disks rotating about intersecting axes, a pair of gauge wheels rotatably supported rearwardly of the disk axes, each wheel being in close proximity to the outer surface of its respective disk, a seed dispensing means for delivering seed to the furrow, and a furrow closing device supported rearwardly of and in tracking relation to the gauge wheels.

50 Claims, 15 Drawing Figures

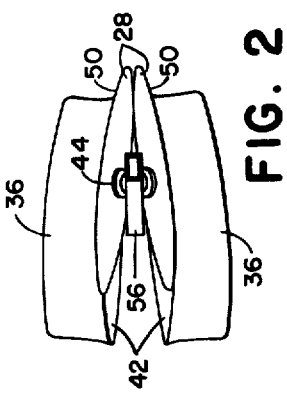
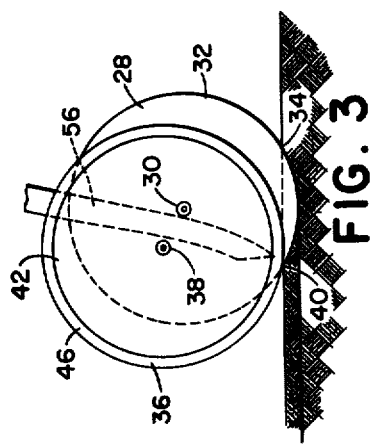
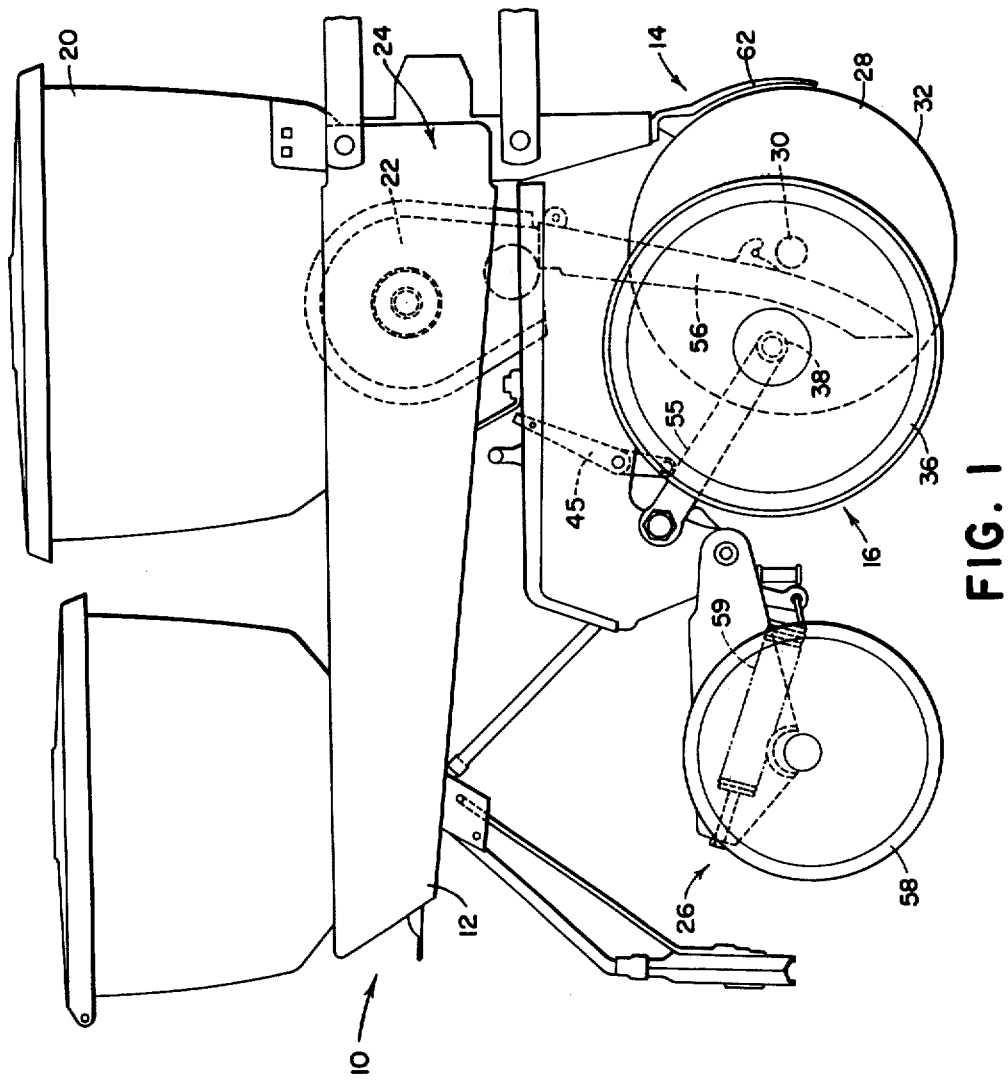

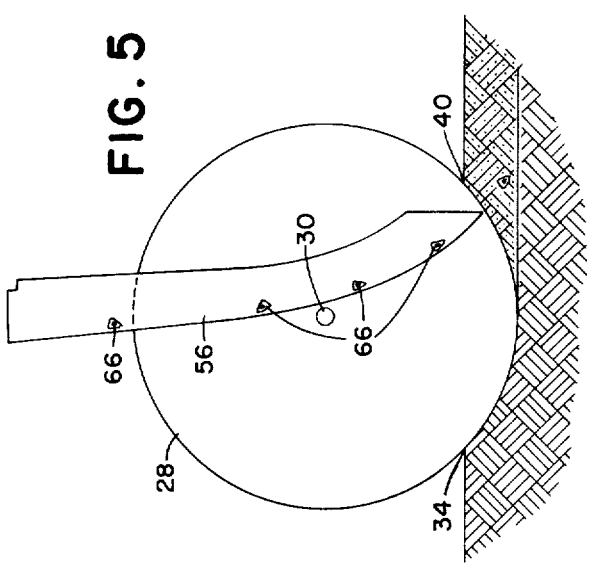
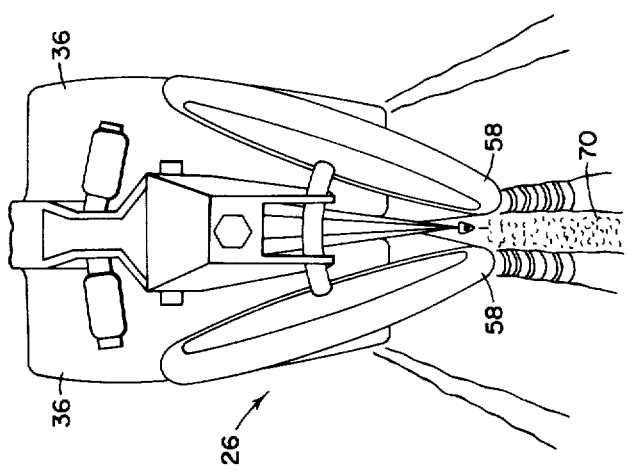
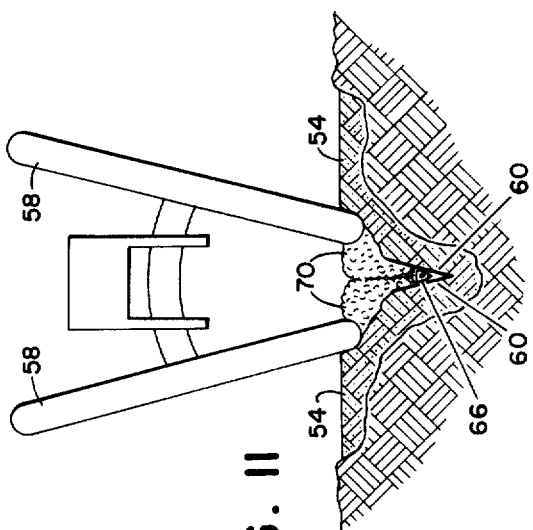
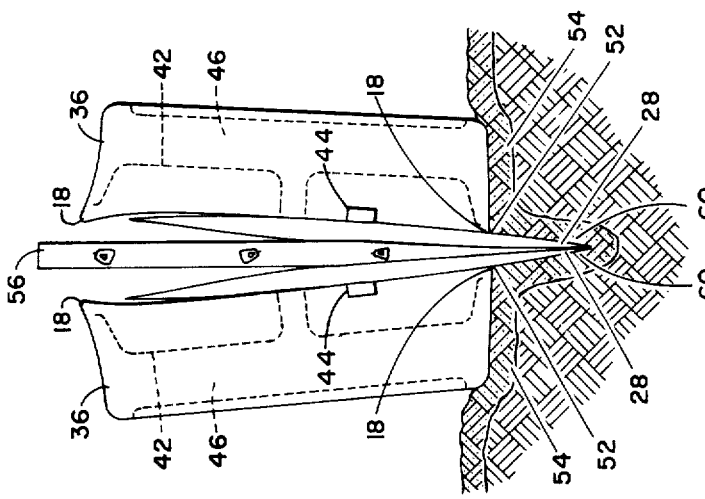

PLANTER APPARATUS AND METHOD FOR PLANTING

BACKGROUND OF THE INVENTION

The present invention relates generally to agricultural equipment and more particularly to a planter having means for opening a V-shaped furrow trench wherein a seed can be accurately placed and spaced apart from other seeds and subsequently covered with a uniform layer of loose soil to facilitate early germination and uniform emergence.

Conventional planters of today, such as that illustrated in U.S. Pat. No. 3,749,035, issued July 31, 1973 to Cayton et al, utilize runner or disk openers to slice a furrow, gauge wheels positioned rearwardly of the openers to regulate the seed planting depth, and disk covering means coupled with press wheels to cover the seed.

The farmer of today is by necessity a businessman who must compete in the economic marketplace. To effectively compete, a farmer must realize high yields from his fields. Such yields require that seeds planted germinate early and emerge uniformly.

Early and uniform emergence of seeds planted depends upon many factors. However, several of the factors such as uniform depth of planting, soil moisture content and seed cover can be influenced by the methods utilized in planting seeds.

Existing planter opening means include disks and runners. However, both means as they exist today open trenchs, wherein the trench walls often collapse into the trench so that no dependable uniform seed depth can be realized. Additionally, the gauging wheels or gauging means utilized on today's planters are positioned rearwardly of the opening means and do not therefore effectively gauge the actual furrow depth being sliced as the planter unit moves over uneven ground. Neither is the seed deposited in the trench at the precise point where the gauge means operates to assure that the seed is planted to a particular depth.

The typical covering means utilized today includes disks to shove soil over the planted seed and press wheels to firm the soil over the seed. However, this means of covering cannot assure a uniform cover of soil nor a loosely gathered cover of soil through which an emerging plant can easily travel.

SUMMARY OF THE INVENTION

Accordingly, it is an object of the present invention to provide a furrow opening means which slices a V-shaped furrow having a consistent shape and depth.

Another object is to provide gauge wheels acting in cooperation with the furrow openers to assure that the soil immediately adjacent to the furrow wall is compactly pressed so that the walls do not collapse. An additional object is to provide a seed delivery means which drops the seed at generally zero forward velocity into the trench at the precise location where the gauge wheels measure the trench planting depth.

Yet another object is to provide a covering means which covers the seed with a predetermined thickness of loose soil as the soil on the sides of the seed is concurrently squeezed to hold the seed firmly in place.

These and other objects are achieved according to the invention, by the provision of a planter unit having a furrow opening means, a pair of adjustable depth gauge wheels mounted on opposing sides of the opening means for regulating the running depth of the opening means, for compacting the furrow walls, and for cleaning the opening disks outer surfaces, a seed dispensing and delivery means positioned between the opening disks for delivering the seed to the furrow at the gauge wheels gauging position, and a closing means following the seed delivery tube to firmly squeeze the furrow sides about the seed and collapse the furrow walls onto the seed to provide a predetermined cover thickness of loose soil.

It is a further object of the invention to provide a method of planting seed comprising the steps of forming a V-shaped furrow with smooth ground surface shoulders extending outwardly from each side of the furrow and at a predetermined vertical distance from the bottom of the furrow; dispensing seed into the furrow and by using the surfaces of the shoulders as reference surfaces applying forces against the surface of the shoulder that are directed inwardly and downwardly so as to compress the soil around the seed while leaving a non-compacted layer of soil above the seed.

BRIEF DESCRIPTION OF THE DRAWINGS

FIG. 1 is a side view schematically illustrating the planter unit.

FIG. 2 is a top view of the disk openers, gauge wheels, and seed delivery tube illustrating the relative positions of each.

FIG. 3 is a side view of the disk openers, gauge wheels and seed delivery tube illustrating the relative positions of the disk and gauge wheel axes.

FIG. 4 is a rear view of the disk openers, gauge wheels and delivery tube as a furrow trench is formed.

FIG. 5 is a side view schematically illustrating the delivery of a seed to the furrow trench.

FIG. 6 illustrates the furrow opening step performed by the disk openers, while

FIG. 7 illustrates the ground compacting step performed by the gauge wheels while

FIG. 8 illustrates the seed delivery step and the relation of the seed delivery tube with respect to the gauge wheel while

FIG. 9 illustrates the seed covering step while

FIG. 10 is a rear view of the closing wheels illustrating the loose soil cover achieved.

FIG. 11 is a rear view of the covering wheels, seed furrow and deposited seed illustrating the seed covering step.

DESCRIPTION OF THE PREFERRED EMBODIMENT

Figure 6:
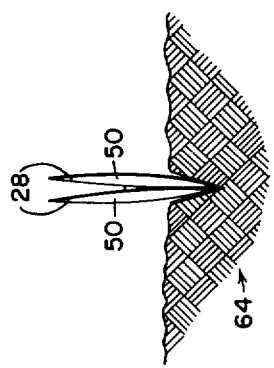
Figure 6A:
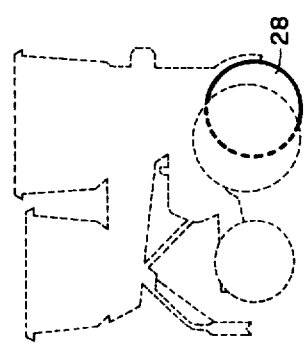
FIG. 6A is a schematic of the planter illustrating in solid lines the portion of the planter performing this furrow opening step.

Referring now to FIG. 1 of the drawings, it will be seen that the improved seed planter implement 10 comprises generally an elongated rectangular structure including a frame 12 having means for attachment to a mobile power unit such as a tractor or to a toolbar.

The planter unit includes a furrow-forming means 14, a depth gauge and furrow edge compacting means 16, including a disk cleaning and furrow edge firming means or flexible lip 18 (see FIG. 4), a seed hopper 20, a seed selecting mechanism 22, and seed dispensing means 24 and a furrow closing means 26.

Mounted on the forward portion of the frame 12 is the furrow-forming means 14 including a pair of ground-engaging furrow-forming disks 28. Each disk 28 is supported on a pivotal structure 30 such that the two disk pivotal axes intersect (see FIG. 2) to cause the disk peripheries 32 to substantially contact at their point of entry into the ground 34 and diverge upwardly and rearwardly relative to their direction of travel.

Rearwardly of the disks 28 is the depth gauge and furrow edge compacting means 16 which includes two depth gauge wheels 36 rotatably mounted on pivotal supports 38 and spaced rearwardly of the disk support 30. The supports 38 are carried on arms or pivot structures 55 which extend therefrom rearwardly and upwardly to the frame 12 where they are pivotally mounted for vertical movement independent of each other. These wheels 36 perform the dual function of supporting the frame 12 relative to the ground and compacting the ground closely adjacent to the furrow where the disks exit at 40 from the ground. The gauge wheels 36 are of a greater diameter than the disk 28 diameter and utilize rims 42 having recessed interior areas which permit the wheel 36 to be vertically adjustable and yet not contact the disk hub 44 during adjustment or operation. To vertically adjust the wheel 36, a height adjusting arm 45 having a lower bearing surface or end bearing against the gauge wheel arm 55 is raised or lowered and a pin is used to secure the arm to the frame. Each pivot structure 55 and its respective gauge wheel 36 is free to move downwardly and away from the lower end of the arm 45 as for example would occur when uneven ground contours are encountered. As can be seen from the drawings, each gauge wheel 36 compactly contacts the ground at about the point 40 where its respective disk exits the ground. Each wheel 36 is provided with a semi-pneumatic rubber tire 46 which constantly flexes during operation to aid in avoiding soil buildup on the wheel.

Attached to the interior periphery of each gauge wheel 36 is the disk cleaning and furrow edge firming means (see FIG. 4). This means includes a flexible lip 18 attached to each gauge wheel interior periphery and operating in face to face contact with the outer surface 50 of that wheel's respective disk 28 at the area where that disk exits the ground. The axis of rotation of the gauge wheels 36 are offset from parallel with their respective disks 28 axis of rotation to permit the lip 18 to scrape the disk 28 during a portion only of each revolution and thereby minimize lip 18 wear as well as produce a shearing action on soil buildup on the disks 28. Each lip 18 scrapes and cleans its respective disk's outer face 50 as the disk peripheries rotate at a more rapid velocity than the gauge wheel peripheries. In drier soil conditions, where it is not necessary for the lip 18 to scrape the disk surface 50, the wheels 36 can be transversely or horizontally adjusted by inserting washers on the pivotal support 38 between the wheel rim 42 inner surface and the wheel support arm 55. Each lip 18 also contacts its respective furrow edge 52 as the gauge wheel 36 compacts the strip of ground 54 adjacent the furrow and thus performs a molding and forming action on its respective furrow edge 52.

Each planting unit is also provided with a seed hopper 20 and seed selecting mechanism 22. A seed delivery tube 56 slopes rearwardly from the seed selecting mechanism 22, passes between the disks 28 and gauge wheels 36 and terminates at ground level and bottom dead center between the gauge wheels 36.

Supported on the frame rearwardly of the gauge wheels 36 is the furrow closing means 26. Included herein are two inclined closing wheels 58 rotatably supported by the frame 12 for ground-engaging contact adjacent the furrow. Each wheel 58 slopes upwardly and outwardly from the furrow trench and is urged downwardly by a spring 59 connected at its forward end below the arm pivotal connection of the closing means 26 with the frame and at its other end rearwardly of said pivotal connection. The force exerted on the ground by the closing wheels is adjustable and can be changed by adjusting the tension on the spring 59 to cause the wheels to exert on the ground a force sufficient to collapse their respective adjacent furrow wall 60.

Although only a single planter unit is herein illustrated, any number of units may be attached to a toolbar or main frame during operation. During operation, the operator will first adjust the planting depth by adjusting the arm 45 to raise or lower the gauge wheels 36. Since the gauge wheels 36 support the planting unit frame 12, adjustment of the arm 45 raises and lowers the planter frame 12 and the frame supported furrow-forming disks 28. While the specific embodiment illustrated is designed to operate within a particular planting depth range, other ranges can be provided by increasing the gauge wheel 36 diameter. As the gauge wheel 36 diameter is increased, the clearance between its rim and the pivotal support 38 is increased and therefore the range of adjustment of the gauge wheel about the pivotal support 38 increases permitting greater range of planting depth and adjustment.

Figure 8:
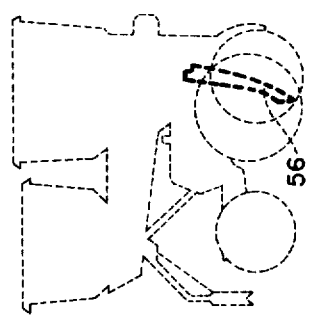
Figure 8A:
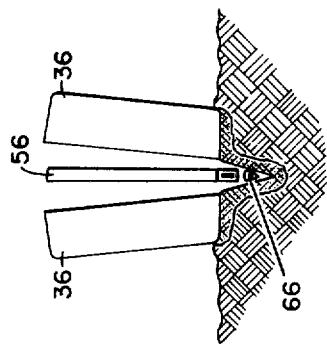
FIG. 8A is a schematic of the planter illustrating in heavy lines the portion of the planter performing this step.

As the planting unit is moved over the ground, the disk peripheries 32 will converge to slice a furrow at approximately the point where the disks 28 enter the ground (see FIGS. 2 and 3). A guard 62 is positioned forward of the disks 28 and seed tube 56 to protect the disks and seed tube from rocks or other foreign materials during this furrow-forming operation. As the disks 28 move through the soil, they carve out an almost perfect V-shaped seed trench 64 (see FIGS. 4 and 6). It is in the bottom of this trench 64 that the seed 66 after being dropped is grasped by the trench walls (see FIGS. 8 and 11).

Usually as a disk 28 exits the ground after slicing a trench, the soil along the walls 60 of the trench adjacent the disk will adhere to the disk blade and be torn away from the furrow by the existing disk. Should the soil be torn away from the trench, uniform covering of the seed may not be possible. Should this soil fall back into the trench, an irregular seed planting depth may result. Should the trench not be cleanly cut and formed, having consistent depth, the seed depth cannot be consistent. To prevent the trench walls 60 from being torn upwardly by the exiting disks and then collapsing into the trench, the gauge wheels 36 are positioned adjacent to their respective disks 28 outer face 50 in the area where the disk 28 leaves the ground (see FIG. 3).

Figure 7:
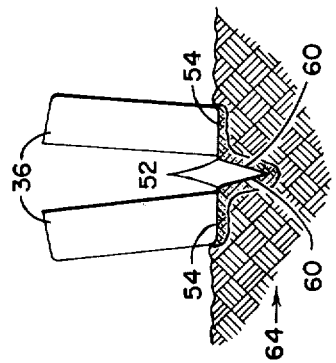
Figure 7A:
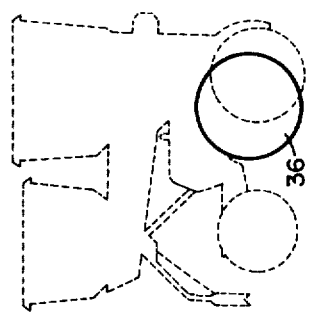
FIG. 7A is a schematic of the planter illustrating in solid lines the portion of the planter performing this step.

Thus as the disks 28 exit from the ground and the walls 60 of the newly cut trench would tend to cling to the disks, the gauge wheels 36 hold the soil firm and prevent the "tearing" of these walls 60 from the trench (see FIGS. 3 and 4). Accordingly, a V-shaped furrow trench having a consistent depth and shape is formed and the walls of the V furrow firmed by the gauge wheels (see FIG. 7).

From the seed hopper 20, seeds 66 are selected by the selecting means and dropped into the seed delivery tube 56. As illustrated in FIGS. 3 and 4, this tube 56 is positioned between the disks 28 and gauge wheels 36 to facilitate dropping the seed at the exact point where the gauge wheels 36 measure the planting depth. In this manner, consistent planting depth of seed is achieved and thereby a generally uniform time of emergence realized. The delivery tube 56 is rearwardly slanted or curved (see FIG. 5) to impart to the dropping seed a rearward component of velocity such that the seed will drop directly into the furrow with little relative velocity with respect to the ground. As the seed is deposited into the trench and settles to the bottom of the V-shaped opening, it is trapped and grasped by the V bottom. As each seed is dropped and grasped, it will settle rather than bounce and a uniform spacing of the seeds can be realized.

To realize the most early and uniform emergence of the plant from the ground, the downwardly converging furrow-closing wheels 58 "cover" the seed with a uniform layer 70 of soil as illustrated in FIGS. 10 and 11. The wheels 58 do not "pack" the soil over the seed as many conventional planter units provide for.

Figure 9:
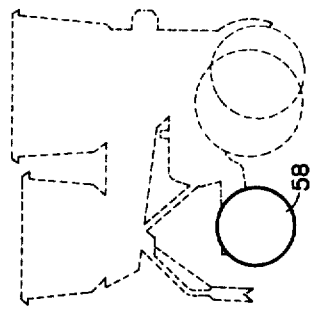
Figure 9A:
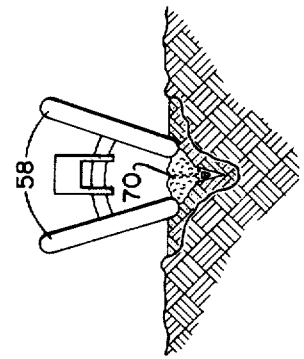
FIG. 9A is a schematic of the planter illustrating in heavy lines the portion of the planter performing this step.

As shown in FIGS. 9, 10, and 11, each closing wheel 58 rides along the ground adjacent its respective trench wall. The closing wheels 58 are angled upwardly and outwardly and thus exert on the strips of soil adjacent the trench a force directed toward the trench bottom. The amount of this pressure can be adjusted for individual soil conditions by adjusting the tension in the spring 59. As the wheels 58 ride along the strips 54 of soil adjacent the trench, the pressure exerted causes the bottom of the trench to close in and around the seed to grasp the seed and hold it firmly in place. Additionally, the angled down pressure acts on the upper walls 60 of the V trench to loosen the trench walls and cause them to fall onto the seed to cover it. This cover 70 of loose soil is not subsequently packed. The operator can regulate the thickness of the cover collapsed onto the seeds as well as the degree of compaction of the soil about the seed by varying the lateral position of the wheels 58 relative to the trench or by changing the angle of the wheels or by varying the downward pressure exerted by the wheels. With this means to provide a loose and predetermined thickness of soil cover, plant emergence will be more uniform and rapid than has been possible with conventional equipment.

I claim:

1. An agricultural implement for planting seeds comprising: a frame having means thereon for securing said frame to a mobile power source; a furrow-forming unit depending from said frame and including a pair of opposed furrow-forming disks having means rotatably supporting said disks on intersecting axes so that the disks diverge upwardly and rearwardly from adjacent edges forward of their axes; gauge wheels carried on and supporting the frame for regulating furrow depth, said gauge wheels being rotatably supported on axes spaced rearwardly of the disk axes and adapted to contact the ground in the area where the disks leave the ground so as to pack the ground on opposite sides of the furrow walls into strips of ground outwardly of and bordering the furrow, said gauge wheel cooperating with said disks to compact the furrow walls; a seed dispensing means including a seed hopper, a seed selecting mechanism, and a seed delivery tube carried by the frame, the tube having a discharge end near the furrow bottom; and a furrow closing means supported rearwardly of the seed delivery tube, said furrow closing means adapted to contact the ground surface outwardly of the furrow and exert thereon a measured force sufficient to collapse the furrow and provide a substantially uncompacted covering for said seeds.

2. The invention as defined in claim 1 wherein the gauge wheel diameter is greater than the diameter of the furrow-forming disks.

3. The invention defined in claim 1 wherein the gauge wheels are further characterized as having means for being horizontally adjusted.

4. The invention defined in claim 1 wherein the gauge wheels include means permitting vertical adjustment thereof.

5. The invention defined in claim 1 wherein each gauge wheel is mounted on the frame for vertical movement independent of the other.

6. The invention defined in claim 1 wherein each gauge wheel is rotatably supported on a vertically adjustable pivot structure depending from the frame.

7. The invention defined in claim 1 wherein the gauge wheels are mounted on respective pivot structures for rotation about axis not parallel with the axis of rotation of the disk adjacent it.

8. The invention defined in claim 1 wherein each gauge wheel is provided at its inner periphery with a flexible lip projecting laterally.

9. The invention defined in claim 8 wherein the axis of rotation of each gauge wheel is rearward of the axis of rotation of its respective disk and the lip of said wheel slidably contacts said disk adjacent to the point of exit of said disk from the ground.

10. The invention defined in claim 1 wherein the seed delivery tube extends downwardly and rearwardly from the selecting mechanism so as to impart to the dispensed seed a rearward velocity compensating for the forward velocity of the machine.

11. The invention defined in claim 10 wherein the seed delivery tube incline is such that the dispensed seed is discharged at a substantially zero velocity relative to the ground.

12. The invention defined in claim 1 wherein the discharge end of the delivery tube is positioned between the gauge wheels and substantially adjacent the point of gauge wheel ground contact.

13. The invention defined in claim 1 wherein the furrow closing means contacts each strip of ground outwardly of the formed furrow walls and exerts a downwardly and inwardly directed force thereon.

14. The invention defined in claim 1 wherein the furrow closing means includes a pair of closing wheels rotatably carried by the frame rearwardly of the seed delivery tube, said wheels contacting the respective strips spaced from the furrow and applying thereupon a predetermined force to collapse the furrow walls and provide an uncompacted covering for said seeds.

15. The invention defined in claim 14 wherein the covering wheels are supported for rotation in laterally spaced planes, and diverge at their respective upper peripheries.

16. The invention defined in claim 15 wherein the covering wheels are carried on an arm pivotally supported by the frame, said arm provided with spring means urging it downwardly.

17. The invention defined in claim 15 wherein the spring means is connected at its one end to the frame vertically spaced below the arm's pivotal connection with the frame and at its other end to the arm rearwardly of said pivotal connection.

18. An agricultural implement for planting seeds comprising: a frame; a pair of opposed furrow-forming disks rotatably supported on said frame on intersecting axes so that the disks diverge upwardly and rearwardly from adjacent edges forward of their axes; vertically adjustable gauge wheels carried on and supporting the frame, said wheels being outwardly of the disks and being rotatably supported on axes spaced rearwardly of the disk axes, said wheels cooperating with said disks to firm the furrow walls and the ground adjacent to the disks as the disks leave the ground; a seed dispensing means including a seed hopper, a seed selecting mechanism and a seed delivery tube carried by the frame, the tube having its discharge end near the furrow bottom; an arm pivotally supported behind the gauge wheels for vertical swinging movement; a furrow closing means carried on the arm including a pair of spaced and upwardly diverging closing wheels carried on the arm and in ground-engaging contact with the respective ground surfaces firmed by the gauge wheels; and biasing means between the frame and arm exerting a downward force thereon sufficient to cause said closing wheels to collapse the furrow and provide a substantially uncompacted covering for said seeds.

19. The invention defined in claim 18 wherein the gauge wheels are further characterized in that they include means for being adjusted horizontally.

20. The invention defined in claim 18 wherein each gauge wheel is rotatably supported on a vertically adjustable pivot structure depending from the frame.

21. The invention defined in claim 20 wherein the gauge wheels are mounted on their respective pivot structures for rotation about axes not parallel with the axes of rotation of the disks adjacent the wheels.

22. The invention defined in claim 21 wherein each pivot structure is mounted on the frame for vertical movement independent of the other pivot structure.

23. The invention defined in claim 20 wherein each gauge wheel is provided with means permitting horizontal adjustment thereof.

24. The invention defined in claim 18 wherein gauge wheel diameter exceeds the disk diameter.

25. The invention defined in claim 18 wherein the seed delivery tube is inclined rearwardly from the selecting mechanism so as to impart to the dispensed seed a rearward velocity to compensate for the forward velocity of the machine as it moves over the field so that the seed has a resultant substantially zero velocity in the fore-and-aft direction.

26. The invention defined in claim 18 wherein the arm is biased downwardly by a spring means having means permitting adjustment of the biasing force thereof.

27. The invention defined in claim 26 wherein the spring is connected at its one end to the frame vertically spaced below the arm's pivotal connection with the frame and at its other end to the arm horizontally spaced from said pivotal connection.

28. An agricultural implement for planting seeds comprising: a frame; a pair of opposed furrow-forming disks rotatably supported by the frame on intersecting axes so that the disks diverge upwardly and rearwardly from adjacent edges forward of their axes; pivot structures carried by the frame rearwardly of the disk axes and being vertically adjustable on the frame; a pair of gauge wheels mounted on the pivot structures outside of and closely adjacent to the respective disks and adapted to cooperate with the disks to compact the furrow walls and contact and firm strips of ground surfaces extending outwardly of and on opposite sides of the furrow; a seed dispensing means including a seed hopper, a seed selecting mechanism, and a seed delivery tube carried by said frame, said tube having its discharge end near the furrow bottom; a pair of upright laterally spaced and upwardly diverging furrow closing wheels; and a downwardly biased arm pivotally supported by the frame for vertical movement and carrying said closing wheels so as to engage and exert on said strips a measured force sufficient to collapse the upper portions of the furrow walls inwardly over the seed to provide a substantially uncompacted covering therefor.

29. The invention defined in claim 28 wherein the pivot structures are mounted on the frame for independent vertical movement.

30. The invention defined in claim 28 wherein each gauge wheel is rotatably mounted on its respective pivot structure for rotation about an axis not parallel with the axis of the disk adjacent that wheel.

31. The invention defined in claim 28 wherein each gauge wheel is further provided with means permitting horizontal adjustment.

32. The invention defined in claim 28 wherein each gauge wheel includes at its inside periphery a flexible lip projecting laterally and contacting the adjacent disk outer surface during rotation.

33. The invention defined in claim 28 wherein the arm is biased downwardly by a spring connected at its one end to the frame vertically spaced below the arm and frame pivotal connection and at its other end to the arm horizontally spaced from said pivotal connection and means between the frame and spring for adjusting the effective biasing force of said spring.

34. An agricultural implement for planting seeds comprising: a frame having means thereon for securing said frame to a mobile power source; a furrow-forming unit carried by said frame and including a pair of furrow-forming disks having means rotatably supporting said disks on intersecting axes so that the disks diverge upwardly and rearwardly from adjacent edges forward of their axes; means on the frame for regulating the furrow depth and for compacting the furrow walls and the strips of ground extending outwardly of and bordering each wall, said means including pivot structures carried by the frame and rotatably supporting gauge wheels on axes spaced rearwardly of the disk axes, said structures being vertically adjustable with respect to the frame and positioning the gauge wheels closely adjacent the furrow where the disks leave the ground and said gauge wheels having a diameter greater than the disk diameter and adapted to contact and firm the strips of ground outwardly of the disks bordering the furrow; a seed dispensing means including a seed hopper, a seed selecting mechanism and a rearwardly slopingly seed delivery tube carried by the frame, said tube having its discharge end near the furrow bottom; and a furrow closing means rearwardly of the seed delivery tube including a pair of upright laterally spaced and upwardly diverging closing wheels rotatably supported by the frame, said wheels downwardly biased to exert on said strips at points remote from the furrow walls a measured force sufficient to collapse upper portions of the furrow walls over the seed to provide a uniform and uncompacted ground covering therefor.

35. The invention defined in claim 34 wherein the closing wheels are carried on an arm pivotally supported by the frame, said arm biased downwardly by spring means including means for adjustment thereof.

36. The invention defined in claim 34 wherein each pivot structure is mounted on the frame for vertical movement independent of the frame.

37. The invention defined in claim 34 wherein each gauge wheel includes a flexible lip extending laterally from its inner periphery and slidingly contacting the outer surface of the adjacent disk during rotation.

38. The invention defined in claim 34 wherein the slope of the seed tube is such that the dispensed seed is discharged at substantially zero velocity relative to the ground.

39. An agricultural implement for planting seeds comprising: a mobile frame; a pair of upright furrow-forming disks rotatably supported on the frame about inersecting axes so that said disks diverge upwardly and rearwardly from adjacent edges forward of their axes; a pair of smooth surface gauge wheels supporting the frame and thereby regulating the operating depth of the furrow-forming disks, said wheels rotatably mounted rearwardly of the disk axes and outside of and in close proximity to the outer surfaces of the disks and cooperative with the latter so as to firm the furrow walls and contact and pack the ground closely adjacent the furrow and form smooth surfaces on opposite sides of the furrow; a seed delivery tube disposed between the disks for delivering seed to the furrow; and a pair of opposed downwardly converging furrow closing wheels supported rearwardly of and in tracking relation respectively to the gauge wheels and engaging the ground spacedly outwardly of the furrow and in the respective smooth surfaces formed by the gauge wheels, said furrow-closing wheels being biased downwardly so as to collapse the upper portions of the furrow walls so as to provide substantially uncompacted soil over the seed.

40. An agricultural implement for planting seeds comprising: a mobile frame; a pair of upright furrow-forming disks rotatably supported on the frame about intersecting axes so that said disks diverge upwardly and rearwardly from adjacent edges forward of their axes; a pair of smooth surface gauge wheels supporting the frame and regulating the operating depth of the furrow-forming disks, said wheels mounted rearwardly of the disk axes for rotation outside of and in close proximity to the outer surfaces of the disks and in contact with the ground closely adjacent the furrow and cooperative with said disks to compact the furrow walls and form continuous smooth surfaces on opposite sides of the furrow; a seed delivery means for delivering seed to the furrow; a furrow closing device supported rearwardly of and in tracking relation respectively to the gauge wheels and engaging the ground on opposite sides of and outwardly of the furrow and in the respective smooth surfaces formed by the gauge wheels, said furrow closing device directing forces downwardly and inwardly with respect to the furrow so as to collapse the furrow walls above the seed and to move substantially uncompacted soil over the seed.

41. An agricultural implement for planting seeds comprising: a mobile frame; a pair of upright furrow-forming disks rotatably carried by the frame about intersecting axes so that said disks diverge upwardly and rearwardly from adjacent edges forward of their axes; a pair of smooth surface gauge wheels supporting the frame and thereby regulating the operating depth of the furrow-forming disks, said wheels being outside of and in close proximity to the outer surfaces of the disks and being rotatably supported on axes spaced rearwardly of the disk axes and cooperative with said disks so as to firm the furrow walls and compactly form continuous smooth surfaces on opposite sides of the furrow; a seed dispensing tube extending downwardly between the disks to a lower end adjacent the lower edges of the disks for delivering seed between the disks and into the furrow; and a furrow closing means including at least one wheel supported rearwardly of and riding on at least one of the smooth surfaces formed by the gauge wheels, and means applying a downward force on the furrow closing wheel sufficient to cause the furrow wall portion at the seed level in the furrow to be firmly closed about the seed and the furrow wall portions above the seed to be collapsed over the seed and thereby provide a comparatively uncompacted cover for the seed.

42. The invention defined in claim 41 characterized by the furrow-closing wheel being inclined upwardly and outwardly from its underside and contacting the ground spacially outwardly of the furrow.

43. The invention defined in claim 42 characterized by biasing means supported on the frame and operatively connected to the furrow-closing wheel.

44. The invention defined in claim 41 in which the gauge wheel engages the ground at the area in which the disks leave the ground.

45. The method of planting seeds, which comprises the steps of: forming in the surface of the ground a seed-receiving trench while subtantially at the same time compacting the walls of the trench and ground surfaces adjacent to and on opposite sides of the trench so as to prevent collapse of the trench walls; dispensing seed into the trench to rest near the bottom thereof; and after dispensing the seed applying downward forces on the aforesaid ground surfaces to collapse the trench walls such that the soil at the level of the seed in the trench is packed tighter than the soil above the seed.

46. The method of planting seeds, which comprises the steps of: continuously forming a seed furrow in the ground while substantially at the same time uniformly compacting the furrow walls and forming a smooth and compacted ground surface on at least one side of the furrow such that the furrow is of a predetermined uniform depth relative to the smooth ground surface; continuously dispensing seed into the furrow; and after dispensing the seed exerting a force on the smooth surface spacedly outwardly of the furrow, said force being directed downwardly and inwardly with respect to the furrow to cause the lower portion of the furrow wall to firmly close about the seed in the furrow and the upper portion of the furrow wall to collapse onto the seed to provide a comparatively uncompacted layer of soil above the seed.

47. The method of planting seeds, which comprises the steps of: forming in the surface of the ground a continuous generally V-shaped seed-receiving trench while substantially at the same time compacting the walls of the trench and the ground surface adjacent the trench to prevent collapse of said trench and realize a predetermined uniform trench depth relative to said adjacent ground surface; dispensing seed into the trench to rest near the bottom thereof; and after dispensing the seed exerting a measured force on said ground surface adjacent the trench to compress the soil adjacent the seed closely thereabout and collapse the trench to provide an uncompacted covering of soil above the seed.

48. In a seed planting implement of the type having a frame securable to a mobile power source and a plurality of seed planting units connected thereto, the improvement comprising: a subframe for each planting unit; a pair of upwardly and rearwardly diverging furrow-forming disks rotatably supported on each subframe about intersecting axes; means on the subframes for regulating furrow depths, for maintaining the furrow walls and forming packed strips of ground extending outwardly from said furrows, said means including vertically adjustable gauge wheels rotatably supported on axes spaced rearwardly of the disk axes, said wheels adapted to contact the ground closely adjacent to the furrow and where the disks leave the ground so as to firmly form the furrow walls and form packed strips of ground outwardly of the disks and bordering the furrow; a plurality of seed dispensing means supported on the subframes, each including a seed hopper having a seed selecting mechanism and a seed delivery tube depending therefrom and having its discharge end near its respective furrow bottom; and a plurality of furrow closing means on the subframes rearwardly of the seed dispensing means adapted to contact said packed strips of ground and exert thereon measured forces sufficient to collapse the upper portions of the furrow walls so as to loosely cover the dispensed seeds.

49. The method of planting seeds, which comprises the steps of: forming in the surface of the ground a continuous upwardly opening seed receiving trench and simultaneously while forming the trench compacting the ground surface adjacent to and outwardly of the trench so as to prevent collapse of the walls of said trench; dispensing seeds into the trench such that the seeds are trapped between the walls of said trench; pressing the soil in the aforesaid ground surface downwardly so that the soil at the seed level of the trench compacts about the seed while at the same time the trench walls above the seed collapse to thereby provide a comparatively uncompacted covering of soil above said seed.

50. An implement for planting seeds comprising: a mobile frame; a pair of upright furrow-forming disks rotatably supported by the frame so as to diverge rearwardly from adjacent edges forward of their axes of rotation; a pair of gauge wheels outside of and in close proximity to the outer surfaces of the disks; pivot structures vertically adjustable with respect to the frame and rotatably supporting the gauge wheels on axes spaced rearwardly of the disk axes and for positioning the gauge wheels so that their lower surfaces engage the ground adjacent the points of exits where the disks leave the ground to thereby firm the walls of the furrow and form continuous smooth surfaces on opposite sides of the furrow; a seed delivery means having a delivery end carried between and closely adjacent but vertically above the lower edges of the disks for delivering seed to the furrow; and a furrow closing device supported rearwardly of the gauge wheels and composed of opposed and upwardly diverging wheels having their lower sides engaging the ground on opposite sides of and spacedly outwardly of the furrow, but within the confines of the respective smooth surfaces formed by the gauge wheels, said diverging wheels directing forces from opposite sides of the furrow downwardly and inwardly with respect to the furrow and for collapsing the furrow walls and moving uncompacted soil over the seed.

* * * * *